(12) United States Patent
Kusch et al.

(10) Patent No.: US 8,829,722 B2
(45) Date of Patent: Sep. 9, 2014

(54) APPARATUS AND METHOD FOR RAPIDLY CHARGING AN ELECTRIC VEHICLE

(75) Inventors: Ruediger Soeren Kusch, Clifton Park, NY (US); Robert Dean King, Schenectady, NY (US); Danijel Maricic, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 353 days.

(21) Appl. No.: 13/285,983

(22) Filed: Oct. 31, 2011

(65) Prior Publication Data

US 2013/0106195 A1 May 2, 2013

(51) Int. Cl.
*H02J 1/00* (2006.01)
(52) U.S. Cl.
CPC ... *H02J 1/00* (2013.01); *Y02E 60/12* (2013.01)
USPC .............................. 307/82; 307/9.1; 307/10.4
(58) Field of Classification Search
USPC .................... 307/18, 64, 66, 82, 58
See application file for complete search history.

(56) References Cited

U.S. PATENT DOCUMENTS

| | | | | |
|---|---|---|---|---|
| 7,528,572 | B2 * | 5/2009 | Masias et al. | 320/110 |
| 7,859,202 | B2 * | 12/2010 | Lukic et al. | 318/139 |
| 8,378,623 | B2 * | 2/2013 | Kusch et al. | 320/104 |
| 2012/0319495 | A1 * | 12/2012 | Muller et al. | 307/82 |

* cited by examiner

*Primary Examiner* — Rexford Barnie
*Assistant Examiner* — Daniel Kessie
(74) *Attorney, Agent, or Firm* — Ziolkowski Patent Solutions Group, SC; Jean K. Testa

(57) ABSTRACT

An energy storage and management system (ESMS) includes one or more energy storage devices configured to store electrical energy, a power electronic conversion system having a plurality of energy ports and including a plurality of DC electrical converters, and a controller configured to split a source current flowing from an electrical source that is connected to one of the plurality of energy ports into a first current and a second current, wherein the first and second currents flows respectively first and second of the plurality of DC converters, alter the first current and the second current by selectively turning on and turning off current flow to the first and second DC converters, and form a charging current by passing the first current and the second current simultaneously to a first of the one or more energy storage devices that is coupled to a second of the plurality of energy ports.

20 Claims, 7 Drawing Sheets

FIG. 3

CHARGER CONFIGURATIONS — 200

| | FUNCTION | PORT 1 | PORT 2 | PORT 3 | PORT4 |
|---|---|---|---|---|---|
| 1 | SINGLE BATTERY W/ INTEGRATED WIDE INPUT RANGE CHARGER | ENERGY BATTERY OR ULTRACAP | U/C BANK | CHARGER INPUT (DC OR RECT. AC) | N.A. |
| 2 | DUAL BATTERY W/ INTEGRATED WIDE INPUT RANGE CHARGER | ENERGY BATTERY OR ULTRACAP | POWER BATTERY | CHARGER INPUT (DC OR RECT. AC) | N.A. |
| 3 | TRIPLE BATTERY W/ INTEGRATED WIDE INPUT RANGE CHARGER | ENERGY BATTERY I OR ULTRACAP | POWER BATTERY | CHARGER INPUT (DC OR RECT. AC) | ENERGY BATTERY II OR ULTRACAP |
| 4 | BOOST BATTERY W/ LOW VOLTAGE CHARGER | ENERGY BATTERY | POWER BATTERY | POWER BATTERY | CHARGER INPUT |
| 5 | DUAL BATTERY W/ INTEGRATED WIDE INPUT RANGE CHARGER AND INTERLEAVING IN NORMAL OPERATION | ENERGY BATTERY | POWER BATTERY | CHARGER INPUT (DC OR RECT. AC) | PARALLEL CONNECTED TO PORT 1 |

202

APPARATUS AND METHOD FOR RAPIDLY CHARGING AN ELECTRIC VEHICLE

BACKGROUND OF THE INVENTION

Embodiments of the invention relate generally to electric drive systems including hybrid and electric vehicles and, more particularly, to rapidly charging energy storage devices of an electric vehicle using a multiport energy management system.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while internal combustion engines (ICEs) may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy (such as a low-voltage "energy" battery) while a second source of stored electrical energy may be used to provide higher-power energy for, for example, acceleration (such as a high-voltage "power" battery or an ultracapacitor).

Plug-in electric vehicles, whether of the hybrid electric type or of the purely electric type, are configured to use electrical energy from an external source to recharge the energy storage devices. Such vehicles may include on-road and off-road vehicles, golf carts, neighborhood electric vehicles, forklifts, and utility trucks as examples. These vehicles may use either off-board stationary battery chargers, on-board battery chargers, or a combination of off-board stationary battery chargers and on-board battery chargers to transfer electrical energy from a utility grid or renewable energy source to the vehicle's on-board traction battery. Plug-in vehicles may include circuitry and connections to facilitate the recharging of the traction battery from the utility grid or other external source, for example.

Battery chargers are important components in the development of electric vehicles (EVs). Historically, two types of chargers for EV application are known. One is a standalone type where functionality and style can be compared to a gas station to perform rapid charging. The other is an on-board type, which may be used for slower C-rate charging from a conventional household outlet. EVs typically include energy storage devices such as low voltage batteries (for range and cruising, for example), high voltage batteries (for boost and acceleration, for example), and ultracapacitors (for boost and acceleration, for example), to name a few. And, in recent years, there has been much advancement in developing batteries having less weight, more energy storage capability, and less cost, as examples, resulting in many types of devices that may require re-charging in an EV application.

The effect of having many devices is generally compounded when considering that in some applications it is desirable to rapidly charge the storage devices using a "gas station" type charging system, while in other applications it is desirable to slow-charge the storage device using a conventional household outlet.

Thus, onboard charging devices have been developed that are configurable in order to accommodate charging multiple types of energy storage devices of electrical vehicles. Typically, such charging devices may include multiple ports that are connectable to one or more power sources, and also connectable via the ports to the various types of energy storage devices of an EV. Further, charging scenarios may vary from one occasion to another, leading to a desire to accommodate numerous charging scenarios as well as being able to accommodate multiple types of energy storage devices. For instance, in one charging situation an energy battery may be nearly fully depleted and other devices may not be depleted at all, while in another charging situation it may be desirable to "top off" the energy battery as well as one or more power devices. In either scenario, again as examples, only one high voltage may be available to provide the recharge energy, or a high voltage and a low voltage source may be dually available for more rapid charging. Thus, onboard charging devices are designed in order to manage a number of charging arrangements and devices connected thereto.

Conventional energy batteries in an EV application are typically not capable of accepting high C-rate charging current, such as at a rate that is known in the industry as a Level 4 charging rate. Thus, recent battery development has also been in providing a more rapid recharge capability in order to reduce charge time. As known in the art, rates of charging are typically dependent on and limited by the battery technology. However, as battery technology has improved, so has the ability to more rapidly recharge them as well. Thus, in some instances the battery itself is no longer the limiting factor in determining how rapidly it may be recharged and instead the charger itself may be the limiting device.

In other instances, the charger itself is not a functional limiter in determining how rapid a battery may be recharged. That is, the charger may be adequately designed in order to accommodate a Level 4 charging rate, as well. However, despite a capability to re-charge an energy storage device at a Level 4 charging rate, the charger may instead have a shortened life because of an increased temperature of operation during high-current recharge and because of ripple current that occurs during recharging. In system operation, current ripple typically occurs as contactors open and close and as the system transiently responds to contactor operation. Thus, life of the contactors and other charger components may be compromised because the higher current operation of Level 4 charging can exacerbate life degradation. In other words, although current ripple typically does occur in lower charging rate situations, because the overall current is lower than in a Level 4 arrangement, the ripple is typically not of enough magnitude to noticeably impact life of the charger and cause the charger to be an overall life limiter in a HV application.

Thus, when operating a charger in a Level 4 charging rate, life of components of the charger may be compromised based not only on an increased operating temperature, but also because the effect of current ripple is compounded with an increased current, as well.

It would therefore be desirable to provide an apparatus and method of increasing robustness in an energy charging device for an EV.

BRIEF DESCRIPTION OF THE INVENTION

The invention is a method and apparatus for minimizing a total recharge time for multiple energy storage devices of an EV.

According to one aspect of the invention, an energy storage and management system (ESMS) includes one or more energy storage devices configured to store electrical energy, a power electronic conversion system having a plurality of energy ports, the power electronic conversion system comprising a plurality of DC electrical converters, and a controller configured to split a source current flowing from an electrical source that is connected to one of the plurality of energy ports into a first current and a second current, wherein the first current flows through a first of the plurality of DC converters and the second current flows through a second of the plurality of DC converters, alter the first current and the second current by selectively turning on and turning off current flow to the first and second DC converters, and form a charging current by passing the first current and the second current simultaneously to a first of the one or more energy storage devices that is coupled to a second of the plurality of energy ports.

In accordance with another aspect of the invention, a method of managing an energy storage and management system (ESMS) includes coupling a current source to a first port of the ESMS, coupling a first energy storage device to a second port of the ESMS, providing a source current to the ESMS from the current source, splitting the source current into a first current at a first voltage and a second current at the first voltage, directing the first current to a first DC voltage converter of the ESMS, directing the second current to a second DC voltage converter of the ESMS, boosting the first voltage of the first current to a second voltage to form a first modified current by selectively turning on and turning off the first DC voltage converter, boosting the first voltage of the second current to the second voltage to form a second modified current by selectively turning on and turning off the second DC voltage converter, and combining the first modified current with the second modified current to provide a charging current to the first energy storage device at the second voltage.

In accordance with yet another aspect of the invention, a non-transitory computer readable storage medium positioned on an energy storage and management system (ESMS) and having stored thereon a computer program comprising instructions which when executed by a computer cause the computer to split a source current flowing from a first electrical source that is connected to a first of a plurality of energy ports into a first current and a second current, wherein the first current flows through a first of a plurality of DC converters and the second current flows through a second of the plurality of DC converters, interleave operation of the first and second DC converters such that each of the first and second DC converters boosts from a first voltage to a second voltage, and form a charging current by passing the first current and the second current simultaneously and at the second voltage to a first of one or more energy storage devices that is coupled to a second of the plurality of energy ports.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIG. 3 is a table illustrating configurations as of the multi-port charger illustrated in FIG. 2.

DETAILED DESCRIPTION

Figure 1:
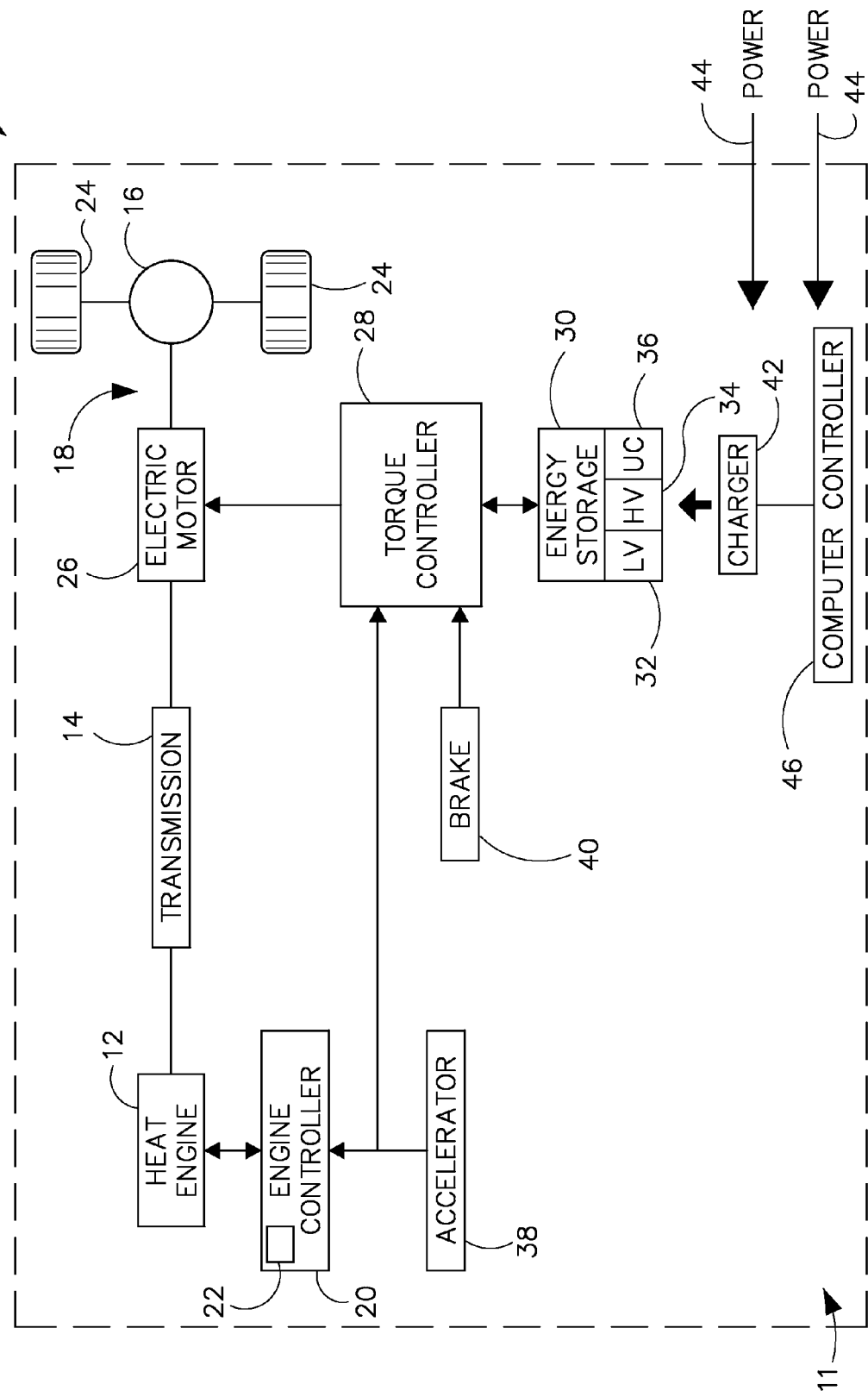
FIG. 1 is a schematic block diagram of an electric vehicle (EV) incorporating embodiments of the invention.

FIG. 1 illustrates one embodiment of a hybrid electric vehicle (HEV) or electric vehicle (EV) 10, such as an automobile, truck, bus, or off-road vehicle, for example, incorporating embodiments of the invention. In other embodiments vehicle 10 includes one of a vehicle drivetrain, an uninterrupted power supply, a mining vehicle drivetrain, a marine apparatus, a marine system, and an aviation system. Vehicle 10 includes an internal combustion or heat engine 12, a transmission 14 coupled to engine 12, a differential 16, and a drive shaft assembly 18 coupled between transmission 14 and differential 16. According to various embodiments, engine 12 may be an internal combustion gasoline engine, an internal combustion diesel engine, an external combustion engine, or a gas turbine engine, as examples. And, although EV 10 is illustrated as a hybrid electric vehicle (HEV), it is understood that EV 10 may be any electric vehicle, such as a plug-in hybrid electric vehicle (PHEV) using other power electronic drives used to operate pulsed loads, according to embodiments of the invention. Thus, this invention is applicable to conventional electric vehicles (EVs) as well as grid-charged hybrid electric vehicles (PHEVs). Grid-charged HEVs provide the option to drive the vehicle for a certain number of miles (i.e., PHEV20, PHEV40, PHEV60). Traditionally, the goal for PHEVs is to provide a high all-electric-range (AER) capability to lower operating cost and be able to optimize the operating strategy.

Vehicle 10 includes an engine controller 20 provided to control operation of engine 12. According to one embodiment, engine controller 20 includes one or more sensors 22 that are configured to sense operating conditions of engine 12. Sensors 22 may include an rpm sensor, a torque sensor, an oxygen sensor, and a temperature sensor, as examples. As such, engine controller 20 is configured to transmit or receive data from engine 12. Vehicle 10 also includes an engine speed sensor (not shown) that measures a crankshaft speed of engine 12. According to one embodiment, speed sensor may measure engine crankshaft speed from a tachometer (not shown) in pulses per second, which may be converted to a revolutions per minute (rpm) signal.

Vehicle 10 also includes at least two wheels 24 that are coupled to respective ends of differential 16. In one embodiment, vehicle 10 is configured as a rear wheel drive vehicle such that differential 16 is positioned near an aft end of vehicle 10 and is configured to drive at least one of the wheels 24. Optionally, vehicle 10 may be configured as a front-wheel drive vehicle. In one embodiment, transmission 14 is a manually operated transmission that includes a plurality of gears such that the input torque received from engine 12 is multiplied via a plurality of gear ratios and transmitted to differential 16 through drive shaft assembly 18. According to such an embodiment, vehicle 10 includes a clutch (not shown) configured to selectively connect and disconnect engine 12 and transmission 14.

Vehicle 10 also includes an electromechanical device such as an electric motor or electric motor/generator unit 26 coupled along drive shaft assembly 18 between transmission 14 and differential 16 such that torque generated by engine 12 is transmitted through transmission 14 and through electric motor or electric motor/generator unit 26 to differential 16. A speed sensor (not shown) may be included to monitor an operating speed of electric motor 26. According to one embodiment, electric motor 26 is directly coupled to transmission 14, and drive shaft assembly 18 comprises one axle or drive shaft coupled to differential 16.

A hybrid drive control system or torque controller 28 is provided to control operation of electric motor 26 and is coupled to motor/generator unit 26. An energy storage system 30 is coupled to torque controller 28 and comprises a low voltage energy storage or energy battery 32, a high voltage energy storage or power battery 34, and an ultracapacitor 36, as examples.

Further, although a low voltage energy storage 32, a high voltage energy storage 34, and an ultracapacitor 36 are illustrated, it is to be understood that energy storage system 30 may include a plurality of energy storage units as understood in the art such as sodium metal halide batteries, sodium nickel chloride batteries, sodium sulfur batteries, nickel metal hydride batteries, lithium ion batteries, lithium polymer batteries, nickel cadmium batteries, a plurality of ultracapacitor cells, a combination of ultracapacitors and batteries, or a fuel cell, as examples. An accelerator pedal 38 and brake pedal 40 are also included in vehicle 10. Accelerator pedal 38 is configured to send throttle command signals or accelerator pedal signals to engine controller 20 and torque control 28.

System 10 includes an energy management storage system (ESMS) or charger 42 coupled to energy storage units 32-36 of energy storage system 30, according to embodiments of the invention. Charger 42 may be coupled to multiple energy storage systems 32-36, as illustrated and charger 42 may be coupled to one or multiple power input lines 44, two of which are illustrated, according to embodiments of the invention. That is, charger 42 illustrates an embodiment of the invention and may be coupled to one or multiple energy storage systems, and charger 42 may be coupled to one or multiple power input systems 44, according to embodiments illustrating use of the invention. Charger 42 includes a controller 46 that is configured to selectively engage and disengage DC electrical devices or buck-boost modules of charger 42 as will be discussed.

And, although charger 42 is illustrated as being coupled to energy storage systems 32-36, and charger 42 is illustrated as coupled to one or multiple power input lines 44, it is to be understood that embodiments of the invention are not to be so limited. Instead, it is to be understood that charger 42 may be coupled to multiple and varying types of energy storage systems and power inputs. Further, it is to be understood that there may be multiple chargers 42 per vehicle in parallel, or that there may be power systems applied to each wheel 24 of vehicle 10, each having a charger 42 coupled thereto.

In operation, it is understood in the art that energy may be provided to drive shaft assembly 18 from internal combustion or heat engine 12 via transmission 14, and energy may be provided to drive shaft assembly 18 via drive control system 28 having energy drawn from energy storage system 30 that may include energy systems 32-36. Thus, as understood in the art, energy may be drawn for vehicle 10 boost or acceleration from, for instance a high voltage storage device 34 that may include a battery, as an example, or from ultracapacitor 36. During cruising (i.e., generally non-accelerating operation), energy may be drawn for vehicle 10 via a low voltage storage device such as low voltage energy storage 32.

And, during operation, energy may be drawn from internal combustion or heat engine 12 in order to provide energy storage 30 or provide power to drive shaft assembly 18 as understood in the art. Further, some systems include a regenerative operation where energy may be recovered from a braking operation and used to re-charge energy storage 30. In addition, some systems may not provide regenerative energy recovery from braking and some systems may not provide a heat engine such as internal combustion or heat engine 12. Nevertheless and despite the ability of some systems to re-charge energy storage 30, energy storage 30 periodically requires re-charging from an external source such as a 115 V household supply or a 230 V 3-phase source, as examples. The requirement to re-charge energy storage 30 is particularly acute in a plug-in hybrid electric vehicle (PHEV) having no heat engine to provide power and an extended range of driving operation.

Thus, embodiments of the invention are flexible and configurable having a plurality of energy ports, and may be coupled to multiple power sources and source types in order to charge one or multiple energy storage types. Further, as will be illustrated, embodiments of the invention allow efficient and balanced charging of multiple energy systems 32-36 of energy storage unit 30, the multiple energy systems having varying levels of depletion.

To meet the demands of modern PHEVs and EVs, the infrastructure should provide typically 7 kW to achieve a state-of-charge (SOC) gain of 80% (assuming a 25 kWh battery) in a charging time of 2 or 3 hours (home charging). For a more aggressive short stop fast charging scenario (e.g., a "gas station") significant higher power levels may be required to achieve a desired 80% (state-of-charge) SOC in 10 minutes. The vehicle interface needs to be designed according to existing standards. A pilot signal determines by its duty cycle the maximum allowable power. Besides a high degree of integration the proposed system provides also single and or three phase AC input, high efficiency, low harmonics, nearly unity input power factor, low cost, low weight and safety interlocking of the equipment. The power factor correction (PFC) requirement may be driven by IEC/ISO/IEEE line harmonic current regulations, as known in the art.

Illustrated in the following figures is an energy management system with an integrated charger unit consisting of three bi-directional buck-boost stages and a charger front end. The system includes also a charger module for high voltage DC and standard AC outlet charging.

In terms of the buck-boost stages, the charger front-end and interface, it generally makes no difference if it is designed for an EV or PHEV application. The role of the DC/DC converter is an efficient energy transfer between two or more energy sources, reliable for continuous and peak power demands. The integration of the charger unit is the next step toward a higher power density design with fewer components and therefore higher reliability. As such, embodiments of the invention are applicable to multiple electric vehicles, including all-electric and hybrid electric vehicles, as examples, designated generally and broadly as "EV"s. Such EVs may include but are not limited to road vehicles, golf carts, trains, and the like, capable of having power systems that include an electric component for causing motion of the vehicle.

In conventional implementations many separate units coexist, to include generally a separate charger, battery management and control unit that are interconnected. In an automotive environment with advanced batteries, communications between the charger and battery or other vehicle systems from different vendors seamless integration is an important consideration. The energy management system with integrated charger is advantageous in that aspect that there is less integration effort required and fewer components improve reliability.

Figure 2:
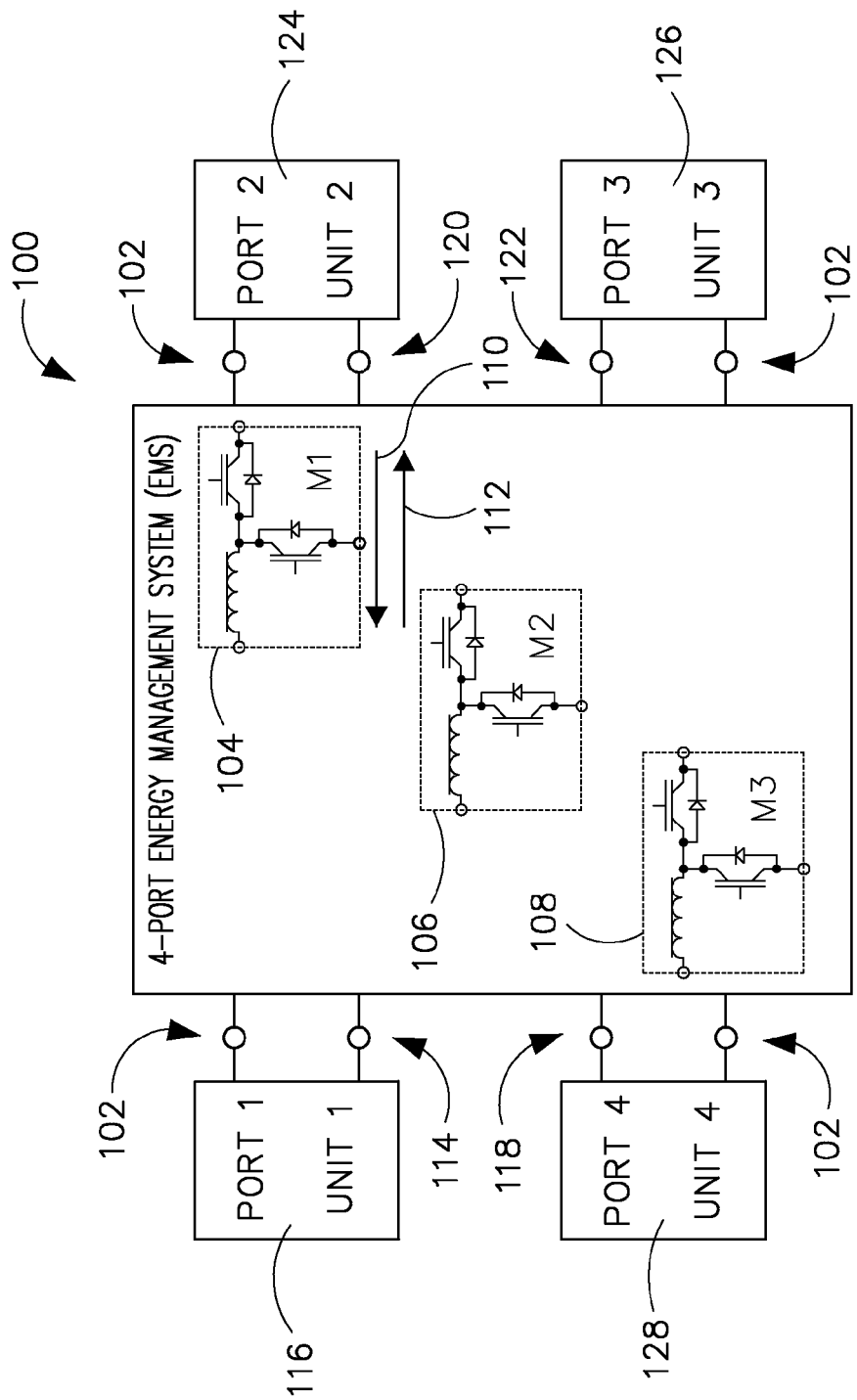
FIG. 2 is a schematic diagram of a configurable multi-port charger architecture according to an embodiment of the invention.

Referring now to FIG. 2, a configurable multi-port integrated charger architecture, energy storage and management system (ESMS, otherwise referred to as energy management system (EMS)) ESMS 100, such as charger 42 is illustrated having four energy ports 102 and three DC electrical conversion devices or buck-boost converters respectively as modules 1, 2, and 3 (104, 106, 108). As known in the art, buck-boost converters 104-108 may be configured to operate in either a buck-mode (i.e., reduced voltage) by flowing electrical energy therethrough in a first direction 110 (illustrated with respect to buck-boost converter 104, but equally applicable to converters 106 and 108), or a boost mode (i.e., increased voltage) by flowing electrical energy in a second direction 112 (illustrated again with respect to buck-boost converter 104, but equally applicable to converters 106 and 108). As also known in the art, buck-boost converters 104-108 may also be configured to operate in conduction mode, where current is passed therethrough without significantly altering a voltage thereof.

As illustrated, energy ports 102 comprise a first energy port P1 114 configurable to have a first unit 116 attached or electrically coupled thereto. Similarly, energy ports 102 comprise fourth, second, and third energy ports P4 118, P2 120, and P3 122 that are configurable to have respective fourth unit 128, second unit 124, and third unit 126 attached or electrically coupled thereto.

According to the invention the charger is part of the vehicle design and mounted on-board. The integrated on-board charger is capable of continuously adjusting input currents to energy ports 114 and 118-120 as a result of, for instance, varying SOC of devices connected thereto for charging.

ESMS 100 of FIG. 2 may be configured to charge up to three energy sources (to include low voltage energy batteries, high voltage power batteries, ultracapacitors, as examples) at the same time or simultaneously. Alternatively and according to embodiments of the invention, ESMS 100 may be used for fast charging of an energy storage device, such as a level 4 rate of charging of 125 A or greater. As will be further illustrated, ESMS 100 has modules therein configured to be interleaved in order to lower ripple current. ESMS 100 also is capable of having multiple charging profiles as a function of SOC and temperature, as examples, for different battery technologies and storage device types. ESMS 100 includes a centralized energy flow control that is centrally controlled by computer/controller 46 of FIG. 1, and ESMS 100 is capable of managing a wide range of input and output voltages.

ESMS 100 of FIGS. 1 and 2 is configurable in multiple configurations, some of which are illustrated in FIG. 3 as a table 200. Each configuration of ESMS 100 may be selectable by contactors (not illustrated), as understood in the art, and energy flow is controlled by ESMS control algorithms implemented in controller 46 of hybrid vehicle 10. The controller 46 can sense a presence of both energy storage devices and charging devices connected to ports 102 and adjust a flow of direction of energy, accordingly. For instance, the control algorithms may determine a voltage of each port to which an energy storage device or an electrical charging system (DC or rectified AC, as examples) is coupled, and operate ESMS 100 accordingly and based on the determined voltages, based on a measured frequency, or both (as examples). And, a benefit for including a rectifier is that even if DC is connected having the wrong polarity, the rectifier provides protection, even if a single phase rectifier is used or if a DC input is used to two of the 3-phase inputs for a 3-phase rectifier.

The wide input voltage integrated charger allows independent and simultaneous charging of two or more batteries of any SOC level respectively from any input voltage level within the voltage limit of ESMS components. The input voltage can range from typical single phase voltages (110V/120V), to 208V/240V and up to 400V or even higher (level 1 . . . 4). The highest currently specified voltage is 400V for rapid DC charging, however with proper selection of ESMS components and according to the invention, up to 480V single or 3-phase AC or even 600 V DC can be utilized to provide higher level of charging for shorter time duration (i.e., fast charging) at, for instance, 125 A or greater. An energy battery is either connected to first energy port 114 or fourth energy port 118 and has typically lower nominal voltages than the power battery on second energy port 120.

Figure 4:
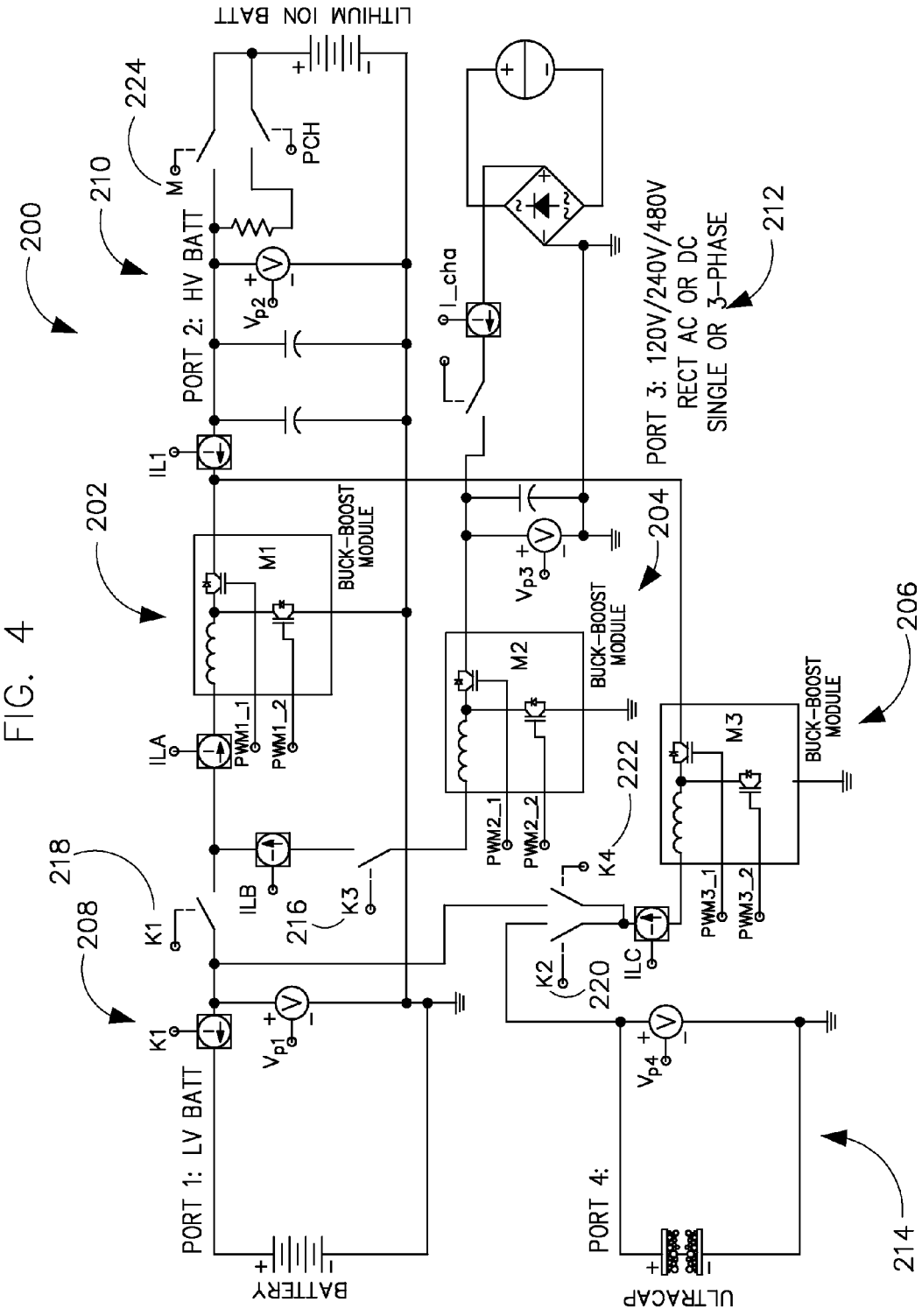
FIG. 4 illustrates an electrical schematic of a multi-port charger according to an embodiment of the invention.

FIG. 4 illustrates a block diagram of a multi-port ESMS according to an embodiment of the invention. For simplicity, control electronic components are omitted. Thus, ESMS 200 illustrates a first buck-boost module 202, a second buck-boost module 204, and a third buck-boost module 206. ESMS 200 also illustrates port P1 208 having a low voltage battery coupled thereto, port P2 210 having a high voltage unit coupled thereto, port P3 212 having a rectified AC or DC voltage coupled thereto, and port P4 214 having a low voltage ultracapacitor coupled thereto. Thus, in the example illustrated, energy storage devices and an energy charger are coupled to ESMS 200 in order to illustrate operation according to one configuration. However, as discussed, ESMS 200 may be configured in numerous arrangements in order to accommodate multiple charger/energy storage arrangements. As such, ESMS 200 includes contactors K3 216, K1 218, K2 220, K4 222, and M 224 which may be selectively engaged or disengaged in order to accomplish configurations for charging, according to the illustrations above.

Each of the three buck-boost modules M1 202, M2 204, M3 206 includes an IGBT leg (upper and lower switch) and an inductor. The high voltage DC bus may be buffered by a number of power capacitors. Each buck-boost converter stage output is equipped with a current sensor, which measures an inductor current. Voltage limits shown at port P3 212 are originated by typical single-phase AC outlet voltages in both the US and Europe. However, in applications requiring higher levels of charge power, port P3 can be coupled to 208V, 240V, or 480V 3-phase, or either 400 V DC or up to 600 V DC.

ESMS 200 uses contactors as main bus and individual module switches. A pre-charge circuit is realized using two power resistors (e.g., 120 ohm, 100 W, RH-50) and a contactor or FET. An additional contactor (K4 222 in FIG. 4) serves in two cases. One is under a certain SOC condition of a battery at port P1 208, and the second if interleaving of module 1 202 and module 3 206 is enabled. FIG. 4 illustrates voltage and current sense points of ESMS 200 having an integrated charger.

Charging in a dual battery configuration as shown here allows charging from a wide input voltage range of batteries with an arbitrary SOC level for both batteries. The internal architecture of the multi-port integrated charger with its software features allows this. Upon power up ESMS 200 control recovers the type of energy storage units that are being used, their energy ratings and limits for charging current and power. From the communication interface to the electric vehicle supply equipment (EVSE) the ESMS sets limits for input current and eventually the type of power source (AC or DC).

Figure 5:
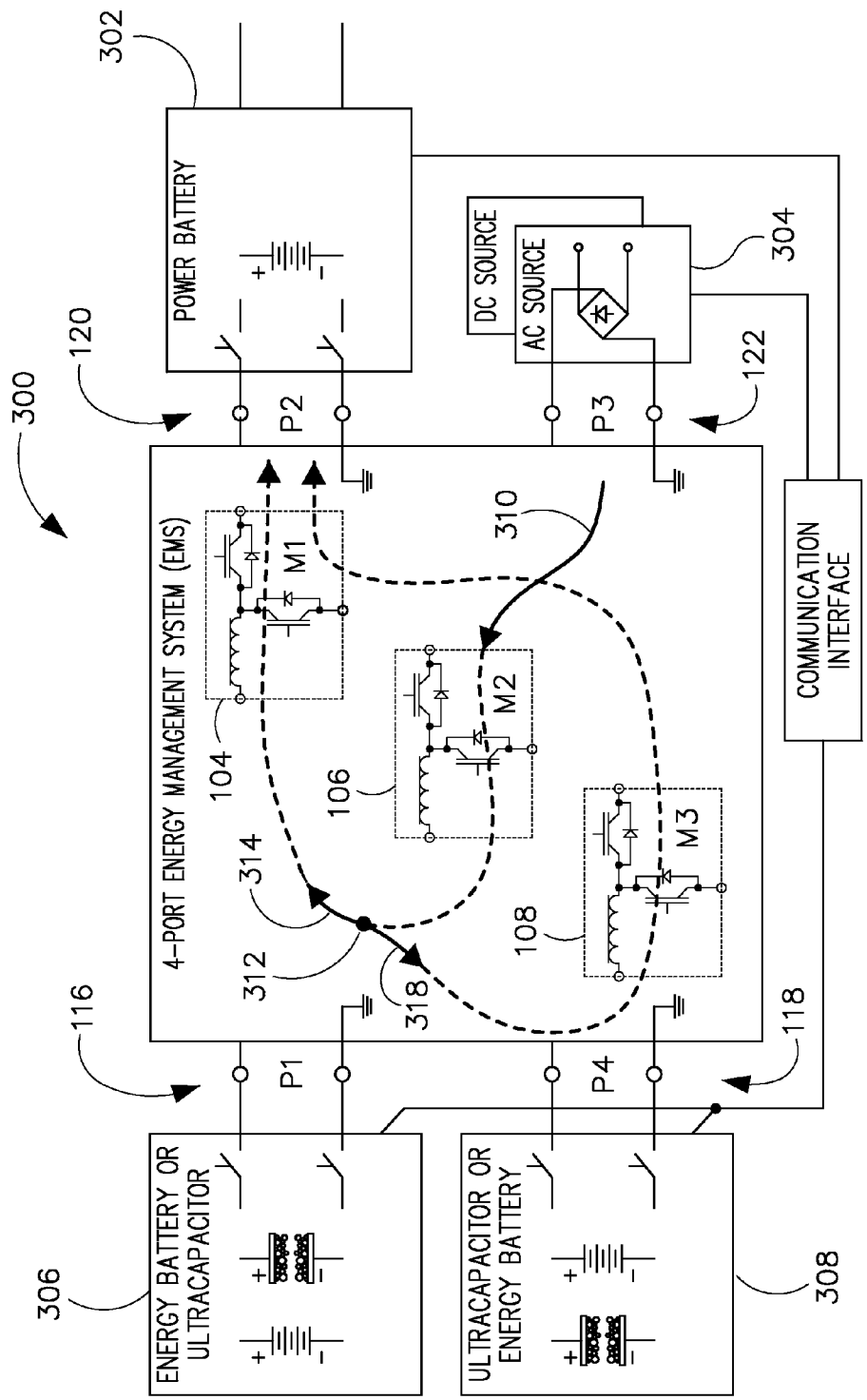
FIG. 5 illustrates an energy storage and management system (ESMS) and current flow therein, according to an embodiment of the invention.

Referring now to FIG. 5 an ESMS arrangement illustrates current flow for an interleaved operation providing Level 4 charging of a power battery according to an embodiment of the invention. That is, ESMS 300 may be operated to direct charging current at a desired voltage to a power battery. Operation of ESMS 300 may be controlled to accommodate various charging arrangements and how they pertain to charge levels of a power battery, from full depletion to near full charge. Operation of ESMS 300 may also be controlled to accommodate a source voltage that is below a desired charging voltage or above a desired voltage. Thus, ESMS 300 may be operated over a range of input and charging voltages, and control of ESMS 300 therefore may be adjusted to accommodate many configurations of charger and source voltages, according to the invention.

ESMS 300 includes modules 1, 2, and 3 (104, 106, 108) as illustrated with respect to FIG. 2 and as similarly discussed with respect to FIG. 4. ESMS 300 includes a power battery 302 coupled to port P2 120, and port P3 122 having a rectified AC or DC voltage 304 coupled thereto. Optionally, one or both of ports P1 114 and P4 118 may include either an energy battery or ultracapacitor 306, 308 coupled thereto.

According to the invention, a source current 310 is provided at port P3 122 that is directed through module M2 106. Charging current is split at point 312 and caused to flow in a first direction as first current 314 toward module M1 104, and in a second direction as second current 316 toward module M3 108. After passing through respective modules M1 104 and M3 108, first and second currents 314, 316 are directed toward port P2 120 and recombined in order to provide a total combined charging current having passed through modules M1 104 and M3 108. As discussed, modules M1 104-M3 108 may be operated in buck mode, boost mode, or in a current mode depending on direction of current flow and on selected mode of operation. Thus, module M2 106 may be operated in current mode or in buck mode to decrease a voltage passing therethrough in the direction illustrated. Each of modules M1 104 and M3 108 may be operated in boost mode and in an interleaved fashion, according to the invention, as well.

Figure 6:
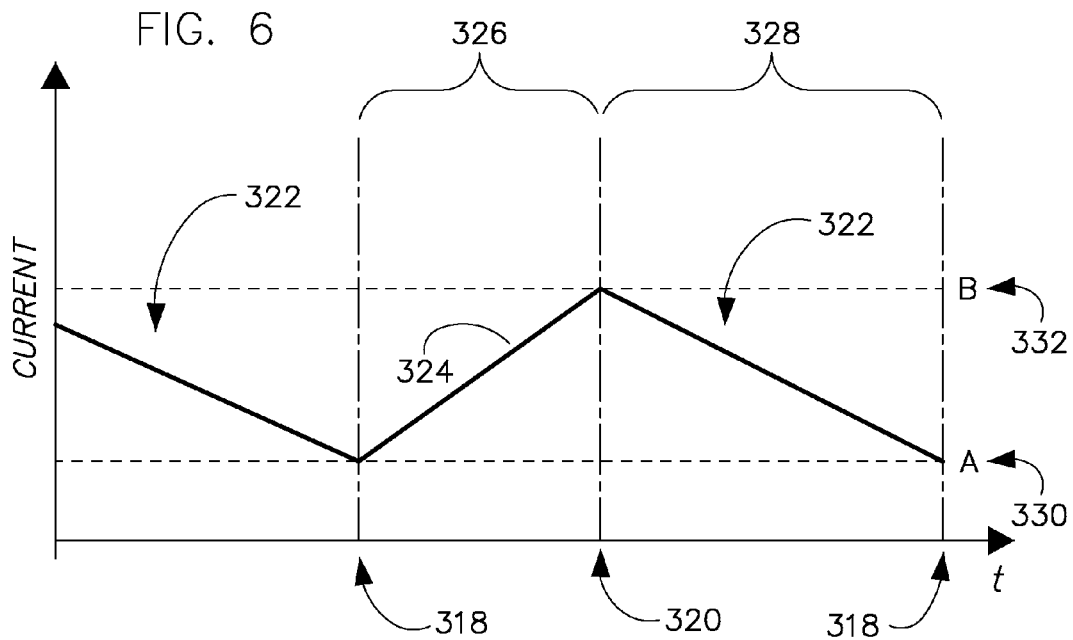
FIG. 6 illustrates a current flow during on and off operation within a buck-boost converter.

In order to further illustrate operation of the interleaved boost mode of operation, the following applies generally to buck-boost converters such as modules 1, 2, and 3 (104, 106, 108). Referring now to FIG. 6, a transient response curve is illustrated for operation of a buck-boost module as it is switched to "on" and "off" positions. At times 318 the current increases with time after a buck-boost module is switched to an "on" mode, and the current decreases with time after being switched to an "off" mode at times 320. That is, when turned off, current passing therethrough decays 322 as energy stored in the inductor releases to the load, and when turned on, the inductor is shortened to ground and the current increases 324. Accordingly, current increases during timeframes 326 and decreases during timeframes 328, the timeframes 326, 328 having different durations because the load creates a higher impedance during discharge than the inductor does during charging. In other words, time duration 326 to rise from current A 330 to current B 332 differs from and is shorter than time duration 328 to decrease from current B 332 to current A 330. As such, referring back to FIG. 5, source current 310 may be split by alternately switching on and off modules M1 104 and M3 108 in an interleaved fashion that also accounts for the different timeframes 326, 328.

Figure 7:
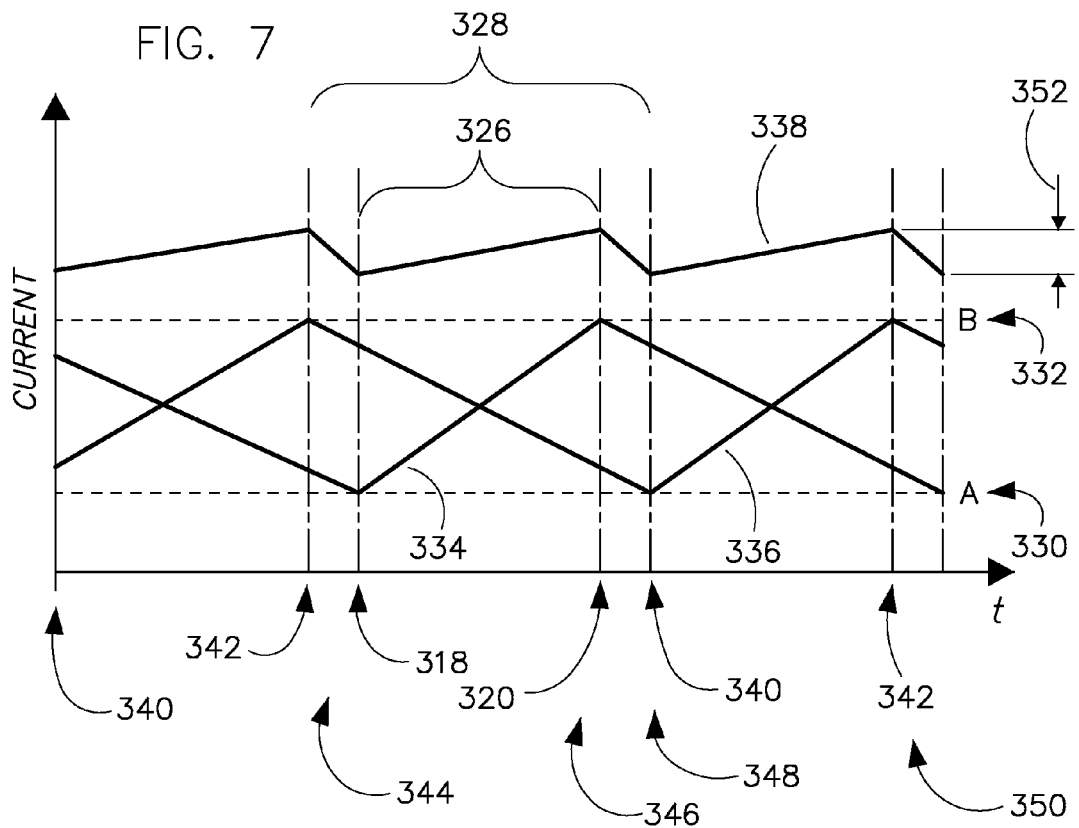
FIG. 7 illustrates interleaved current flow in two buck-boost modules and a resulting current sum, according to an embodiment of the invention.

Referring to FIG. 7, a first current 334 is illustrated that corresponds generally to the current illustrated in FIG. 6. A second current 336 is also illustrated that is similar in form to first current 334, but offset in time to interleave the two currents 334, 336 which, when recombined at port P2 120, form a charging current 338, according to the invention. First current 334 corresponds to current passing through one of modules M1 104 and M3 108, and second current 336 corresponds to the current passing through the other of modules M1 104 and M3 108. That is, first current 334 represents current passing through its respective module when turned on at points 318 and off at points 320. Similarly, second current 336 represents current passing through its respective module when turned on at points 340 and off at points 342. Currents 334, 336 generally add to form charging current 338 at port P2 120 which, in one embodiment, is a current that is greater than 125 A.

As such, in operation and assuming (for illustration purposes) the first current 334 corresponds to current 314 of FIG. 5 passing through module M1 104, and assuming second current 336 corresponds to current 316 of FIG. 5 passing through module M3 108, currents 314 and 316 are directed to port P2 120 and combined in order to provide an interleaved current such as charging current 338. First current 334 is turned on 344 while first current 334 rises, switched off 346 while first current 334 falls, and then a short duration later, second current 336 is switched on at 348 and off at 350. The on-off pattern repeats and one skilled in the art will recognize that the timing of the signals, whether and how much to boost and/or buck the voltage through the respective modules, and the frequency of switching, will depend on specifics of the circuit in order to obtain a reduced current variation and an interleaved operation.

As such, each module M1 104 and M3 108 is caused to operate having a lower current than would be the case were all of the charging current to be directed through a single one of either module. Further, the total amount of current variation 352 in charging current 338 is significantly reduced when compared to what would otherwise occur, were the modules not interleaved and instead all current were driven through a single module after passing through module M2 106. In operation as well, module M2 106 may be caused to operate in conduction mode or in buck mode, and modules M1 104 and M3 108 may be operated in boost mode, depending on the requirements of the charging scenario (i.e., voltage input at port P3 122, SOC of power battery 302 at port P2 120.

Further, and referring back to FIG. 5, an additional supply current may be provided at one or both ports P1 104 and P4 118 from an energy battery or an ultracapacitor in order to account for current changes and augment current flow resulting from bucking and/or boosting operations. The supply current may be provided in addition to various points in the circuit, to include at point 312, directly to either module M1 104 and M3 108, or to port P2 120.

Figure 8:
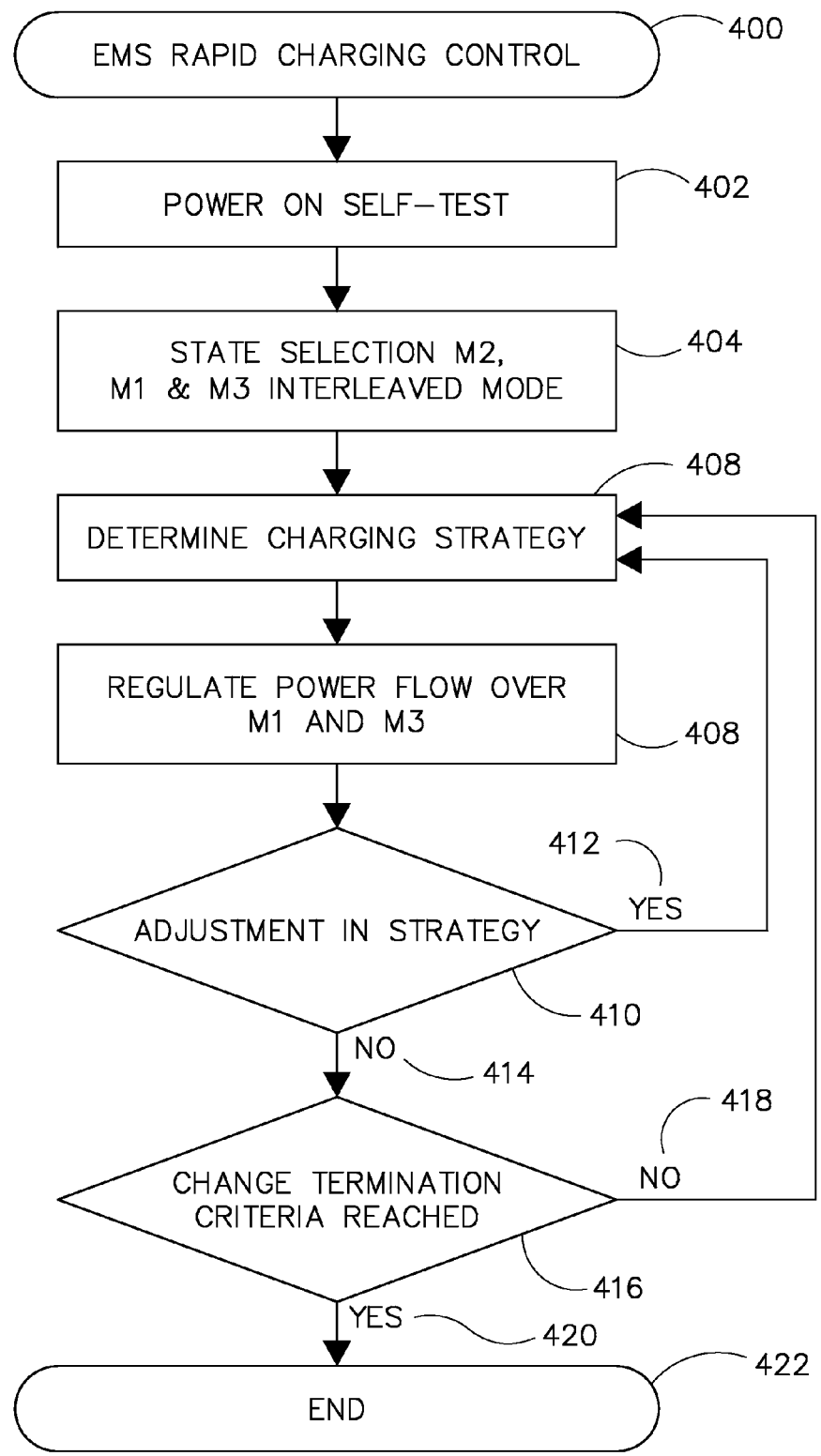
FIG. 8 illustrates a strategy for implementing charging of an energy storage device, according to the invention.

Thus, referring now to FIG. 8 a method is illustrated therein for rapid charging an energy storage device, according to the invention. ESMS rapid charging begins at step 400. Each buck-boost module runs an independent state machine, and the states are disabled/standby, buck mode enabled, boost mode enabled or enabled permanent conducting upper switch (specific to module 2 106 as illustrated in FIG. 2). Power on self-test occurs at step 402 and module state selection occurs at step 404. That is, module M2 106 may be selected to operate in buck mode or in permanent conducting mode, and modules M1 104 and M3 108 may be selected to operate in interleaved mode, with their timing of on-off operation being selected based on the aforementioned discussion and parameters of the circuit. The charging strategy is selected at step 406 to include settings, current split, etc. . . . based on system knowledge, SOC, etc. . . . . Power is regulated to modules M1 and M3 at step 408 and, as the SOC changes, as an example, the charging strategy is assessed at step 410. If adjustment is desired 412, then strategy is assessed again at step 406. If not 414, then SOC of the power battery is assessed 416. If SOC criteria has not been met 418, then control returns to step 406 and the strategy is assessed again. If so 420, the process ends at step 422.

A technical contribution for the disclosed apparatus is that it provides for a controller implemented technique for electric drive systems including hybrid and electric vehicles and, more particularly, to rapidly charging energy storage devices of an electric vehicle using a multiport energy management system.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

According to one embodiment of the invention, an energy storage and management system (ESMS) includes one or more energy storage devices configured to store electrical energy, a power electronic conversion system having a plurality of energy ports, the power electronic conversion system comprising a plurality of DC electrical converters, and a controller configured to split a source current flowing from an electrical source that is connected to one of the plurality of energy ports into a first current and a second current, wherein the first current flows through a first of the plurality of DC converters and the second current flows through a second of the plurality of DC converters, alter the first current and the second current by selectively turning on and turning off current flow to the first and second DC converters, and form a charging current by passing the first current and the second current simultaneously to a first of the one or more energy storage devices that is coupled to a second of the plurality of energy ports.

In accordance with another embodiment of the invention, a method of managing an energy storage and management system (ESMS) includes coupling a current source to a first port of the ESMS, coupling a first energy storage device to a second port of the ESMS, providing a source current to the ESMS from the current source, splitting the source current into a first current at a first voltage and a second current at the first voltage, directing the first current to a first DC voltage converter of the ESMS, directing the second current to a second DC voltage converter of the ESMS, boosting the first voltage of the first current to a second voltage to form a first modified current by selectively turning on and turning off the first DC voltage converter, boosting the first voltage of the second current to the second voltage to form a second modified current by selectively turning on and turning off the second DC voltage converter, and combining the first modified current with the second modified current to provide a charging current to the first energy storage device at the second voltage.

In accordance with yet another embodiment of the invention, a non-transitory computer readable storage medium positioned on an energy storage and management system (ESMS) and having stored thereon a computer program comprising instructions which when executed by a computer cause the computer to split a source current flowing from a first electrical source that is connected to a first of a plurality of energy ports into a first current and a second current, wherein the first current flows through a first of a plurality of DC converters and the second current flows through a second of the plurality of DC converters, interleave operation of the first and second DC converters such that each of the first and second DC converters boosts from a first voltage to a second voltage, and form a charging current by passing the first current and the second current simultaneously and at the second voltage to a first of one or more energy storage devices that is coupled to a second of the plurality of energy ports.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An energy storage and management system (ESMS) comprising:
    one or more energy storage devices configured to store electrical energy;
    a power electronic conversion system having a plurality of energy ports, the power electronic conversion system comprising a plurality of DC electrical converters; and a controller configured to:
split a source current flowing from an electrical source that is connected to one of the plurality of energy ports into a first current and a second current, wherein the first current flows through a first of the plurality of DC converters and the second current flows through a second of the plurality of DC converters;
alter the first current and the second current by selectively turning on and turning off current flow to the first and second DC converters; and
form a charging current by passing the first current and the second current simultaneously to a first of the one or more energy storage devices that is coupled to a second of the plurality of energy ports.

2. The ESMS of claim 1 wherein the charging current is greater than 125 A.

3. The ESMS of claim 1 wherein each DC electrical converter is configured to:
step up a DC voltage;
step down a DC voltage; and
pass a current without a significant change in voltage, wherein:
each of the plurality of energy ports is coupleable to each of the one or more energy storage devices; and
each of the plurality of energy ports is coupleable to an electrical source.

4. The ESMS of claim 1 wherein the controller is configured to interleave the first current and the second current respectively through the first and second DC converters by being configured to:
perform the following steps sequentially in time:
(1) switch on the first DC converter;
(2) switch off the first DC converter;
(3) switch on the second DC converter; and
(4) switch off the second DC converter; and
repeat steps (1) through (4) in order to generate the charging current.

5. The ESMS of claim 1 wherein the first and second DC converters are each respectively configured to boost an incoming voltage that corresponds to each of the first and second currents.

6. The ESMS of claim 1 wherein the controller is configured to direct the source current through a third DC converter prior to splitting the source current into the first current and the second current.

7. The ESMS of claim 6 wherein the controller is configured to operate the third DC converter such that the third DC converter performs one of the following:
buck the voltage of the source current to a lower voltage; and
pass the source current to where the current is split into the first current and the second current without significantly altering the voltage thereof.

8. The ESMS of claim 1 wherein a second of the one or more energy storage devices is coupled a third of the plurality of energy ports and configured to provide a supply current to the first energy storage device.

9. A method of managing an energy storage and management system (ESMS) comprising:
coupling a current source to a first port of the ESMS;
coupling a first energy storage device to a second port of the ESMS;
providing a source current to the ESMS from the current source;
splitting the source current into a first current at a first voltage and a second current at the first voltage;
directing the first current to a first DC voltage converter of the ESMS;
directing the second current to a second DC voltage converter of the ESMS;
boosting the first voltage of the first current to a second voltage to form a first modified current by selectively turning on and turning off the first DC voltage converter;
boosting the first voltage of the second current to the second voltage to form a second modified current by selectively turning on and turning off the second DC voltage converter; and
combining the first modified current with the second modified current to provide a charging current to the first energy storage device at the second voltage.

10. The method of claim 9 wherein the charging current is greater than 125 A.

11. The method of claim 9 comprising interleaving operation of the first DC voltage converter and the second DC voltage converter by sequentially in time performing the following steps:
(1) turning on the first DC voltage converter;
(2) turning off the first DC voltage converter;
(3) turning on the second DC voltage converter; and
(4) turning off the second DC voltage converter; and
repeating steps (1)-(4) to generate the charging current.

12. The method of claim 11 comprising directing the source current to a third DC voltage converter prior to splitting the source current into the first current and the second current.

13. The method of claim 12 comprising:
bucking a voltage of the source current to a lower voltage in the third DC voltage converter; or
passing the source current through the third voltage converter without significantly altering a voltage thereof.

14. The method of claim 9 comprising:
coupling a second energy storage device to a third port of the ESMS;
providing a supply current to the energy storage device from the second energy storage device and to the first energy storage device.

15. A non-transitory computer readable storage medium positioned on an energy storage and management system (ESMS) and having stored thereon a computer program comprising instructions which when executed by a computer cause the computer to:
split a source current flowing from a first electrical source that is connected to a first of a plurality of energy ports into a first current and a second current, wherein the first current flows through a first of a plurality of DC converters and the second current flows through a second of the plurality of DC converters;
interleave operation of the first and second DC converters such that each of the first and second DC converters boosts from a first voltage to a second voltage; and
form a charging current by passing the first current and the second current simultaneously and at the second voltage to a first of one or more energy storage devices that is coupled to a second of the plurality of energy ports.

16. The computer readable storage medium of claim 15 wherein the charging current is greater than 125 A.

17. The computer readable storage medium of claim 15 wherein the computer is caused to interleave operation of the first and second DC converters by being programmed to, sequentially in time:
(1) switch on the first DC converter;
(2) switch off the first DC converter;
(3) switch on the second DC converter; and (4) switch off the second DC converter; and
repeat steps (1) through (4) continuously in order to generate the charging current.

18. The computer readable storage medium of claim 15 wherein the computer is caused to direct the source current through a third of the plurality of DC converters prior to splitting the source current flowing from the electrical source.

19. The computer readable storage medium of claim 18 wherein the computer is caused to operate the third DC converter such that the third DC converter performs one of the following:
  buck a voltage of the source current to the first voltage; and
  pass the source current to where the current is split into the first current and the second current without significantly altering a voltage thereof.

20. The computer readable storage medium of claim 15 wherein the computer is caused to provide a supply current to the first energy storage device from a second energy source that is coupled to a second of the plurality of energy ports.

* * * * *